C. W. & W. J. ALTER.
TIRE VULCANIZER.
APPLICATION FILED JULY 15, 1916.

1,273,124.

Patented July 23, 1918.

C. W. Alter,
W. J. Alter,
Inventors

By Geo. P. Kimmel.

Attorney

UNITED STATES PATENT OFFICE.

CECIL W. ALTER AND WILTON J. ALTER, OF HAGERMAN, NEW MEXICO.

TIRE-VULCANIZER.

1,273,124.  Specification of Letters Patent.  Patented July 23, 1918.

Application filed July 15, 1916. Serial No. 109,458.

*To all whom it may concern:*

Be it known that we, CECIL W. ALTER and WILTON J. ALTER, citizens of the United States, and residents of Hagerman, in the county of Chaves and State of New Mexico, have invented certain new and useful Improvements in Tire-Vulcanizers, of which the following is a specification.

The present invention relates to plastics and more particularly to new and useful improvements in tire vulcanizing and repairing presses.

The primary object of our invention is to provide in a simple, strong and durable and compact structure an effective tire vulcanizer.

Another object of our invention is to provide a tire vulcanizer and vulcanizing heater having a new and improved arrangement of elements facilitating the holding and vulcanizing of the tire simultaneously.

A further object of our invention is to provide a tire vulcanizing press of the class described having a new and improved arrangement of the fuel chamber and air chamber whereby to obtain a maximum amount of heat for the amount of fuel used, our improved air supply chamber enhancing the efficiency of the device.

Figure 1:
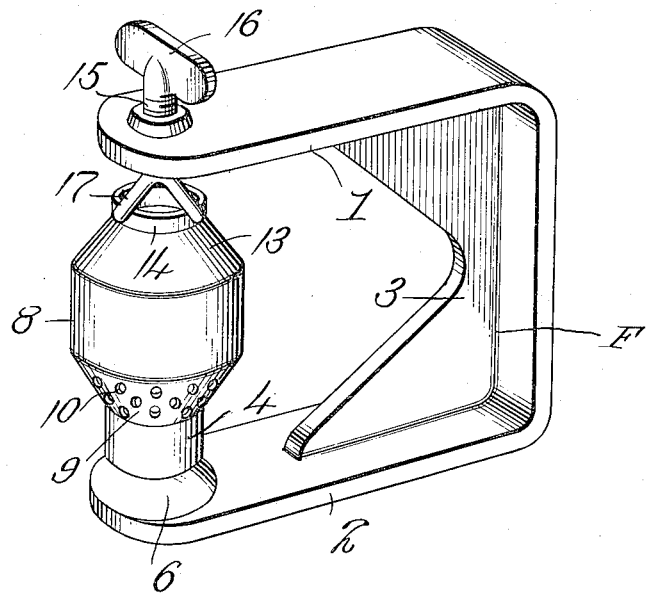
Figure 2:
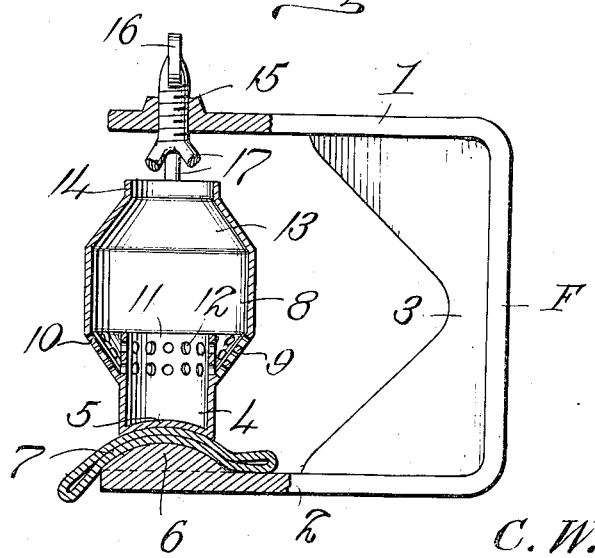

Other objects and advantages to be derived from the use of our improved tire vulcanizer will appear from the following detail description and the claim, taken with an inspection of the accompanying drawing, in which:

Figure 1 is a perspective view of a tire vulcanizer press embodying the improvements of our invention; and Fig. 2 is a side elevational view of the same, the vulcanizing heater being shown in vertical section.

Referring more particularly to the drawing, wherein similar characters of reference designate like and corresponding parts throughout the various views, F indicates a supporting frame, said frame being U-shaped in configuration, having spaced parallel arms 1 and 2 forming the top and base members of the frame. A strengthening web 3 serves to maintain the arms 1 and 2 against distortion when in use.

The vulcanizing heater of our invention includes a fuel container 4 having a concavo-convex bottom 5 conforming in contour with the convex enlargement 6 formed on the base 2. The object to be vulcanized is placed between the bottom 5 and the enlargement 6, in the present instance a tire 7 being shown in Fig. 2.

A combustion chamber 8 is provided, preferably formed integrally with the fuel chamber 4, a connecting inclined wall 9 extending between the chamber 8 and the container 4. A plurality of air inlet openings 10 are provided in the inclined wall 9. The fuel container 4 extends upwardly into the air chamber 8 as indicated at 11, said portion 11 having air openings 12 formed therein, said openings permitting the proper mixture of air with the gas derived from the fuel contained in the chamber 4 whereby to obtain the greatest amount of heat possible.

The upper end of the combustion chamber 8 is reduced as at 13 and formed with an annular flange 14, a clamping screw 15 having a finger engaging portion 16 being arranged in the arm 1 and having divergent legs 17 for engagement with said flange 14.

In use the chamber 4 is partly filled with a liquid fuel such as alcohol and the same lighted. An object to be vulcanized is placed on the enlargement 6, in the present instance an automobile tire or the like, and the screw 15 is tightened down upon the flange 14. This serves to firmly clamp the tire in position during the vulcanizing process. It will be seen that as the heat created by the burning fuel passes upwardly through the combustion chamber 8 air is caused to enter the air opening 12 mixing with the flame of the burning fuel and increasing the heat derived therefrom. Thus it will be seen that in the provision of our improved vulcanizer we have afforded means for firmly clamping an automobile tire or the like in position for the vulcanizing process, at the same time applying the necessary heat thereto.

From the above description taken in connection with the accompanying drawing, it is thought that a clear and comprehensive understanding of the construction, operation and advantages of our invention may be had; and while we have shown and described the device as embodying a specific structure we desire that it be understood that such changes may be made in said structure as do not depart from the spirit and scope of the invention.

Having thus fully described our inven- tion, what we claim as new and desire to secure by Letters Patent, is:

In a vulcanizing device, a frame, a heater comprising a container having an enlarged intermediate portion, the lower portion of said enlarged portion being perforated, a perforate collar formed integral with and extending upwardly in the container to a point level with the uppermost perforations in the enlarged portion and in spaced relation thereto, and clamping means arranged on the frame engageable with the upper end of said container.

In testimony whereof, we affix our signatures hereto.

CECIL W. ALTER.
WILTON J. ALTER.